United States Patent
Hirano et al.

(10) Patent No.: US 8,673,444 B2
(45) Date of Patent: Mar. 18, 2014

(54) ACRYLIC PRESSURE-SENSITIVE ADHESIVE RESIN COMPOSITION, AND PRESSURE-SENSITIVE ADHESIVE SHEET OR PRESSURE-SENSITIVE ADHESIVE TAPE USING THE SAME

(75) Inventors: Keisuke Hirano, Osaka (JP); Yutaka Moroishi, Osaka (JP)

(73) Assignee: Nitto Denko Corporation, Osaka (JP)

( * ) Notice: Subject to any disclaimer, the term of this patent is extended or adjusted under 35 U.S.C. 154(b) by 449 days.

(21) Appl. No.: 13/017,140

(22) Filed: Jan. 31, 2011

(65) Prior Publication Data

US 2011/0189478 A1 Aug. 4, 2011

(30) Foreign Application Priority Data

Feb. 1, 2010 (JP) ................................. 2010-020612

(51) Int. Cl.
*C09J 7/02* (2006.01)
*C09J 183/06* (2006.01)

(52) U.S. Cl.
USPC ..................... 428/355 AC; 525/100; 524/261

(58) Field of Classification Search
USPC ..................... 428/355 AC; 525/100; 524/261
See application file for complete search history.

(56) References Cited

U.S. PATENT DOCUMENTS 5,231,156 A * 7/1993 Lin ............................. 526/279

FOREIGN PATENT DOCUMENTS

| CN | 1424353 A | 6/2003 |
|---|---|---|
| CN | 101497769 A | 8/2009 |
| EP | 1 985 666 A1 | 10/2008 |
| EP | 1985666 A1 * | 10/2008 |
| JP | 2006-143858 A | 6/2006 |
| JP | 2008-133408 A | 6/2008 |
| JP | 2008-308548 A | 12/2008 |

OTHER PUBLICATIONS

Office Action dated Jan. 7, 2013, issued by the State Intellectual Property Office of the P.R. of China in counterpart Chinese Patent Application No. 201110036036.1.
Extended European Search Report issued on May 9, 2011 in the corresponding European Patent Application No. 11152882.4.

* cited by examiner

*Primary Examiner* — Michael Bernshteyn
(74) *Attorney, Agent, or Firm* — Sughrue Mion, PLLC

(57) ABSTRACT

The present invention relates to an acrylic pressure-sensitive adhesive resin composition including an organic-inorganic hybrid polymer synthesized from the following (a) to (d): (a) fine silica particles having silanol groups on a surface thereof; (b) a siloxane having at least one selected from a group consisting of an alkoxysilyl group and a silanol group at a molecular end thereof; (c) a trialkoxysilane represented by the following general formula (I) in which $R^1$ represents a $C_{1-6}$ alkyl group, and $R^{1'}$ represents a hydrogen atom or a methyl group; and (d) a (meth)acrylic monomer:

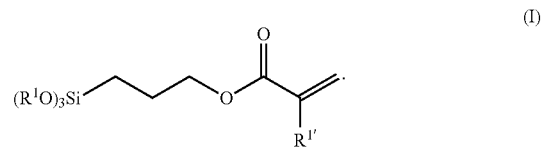

(I)

8 Claims, No Drawings

ACRYLIC PRESSURE-SENSITIVE ADHESIVE RESIN COMPOSITION, AND PRESSURE-SENSITIVE ADHESIVE SHEET OR PRESSURE-SENSITIVE ADHESIVE TAPE USING THE SAME

FIELD OF THE INVENTION

The present invention relates to an acrylic pressure-sensitive adhesive resin composition having excellent adhesiveness, transparency, and heat resistance and a pressure-sensitive adhesive sheet or pressure-sensitive adhesive tape which has a pressure-sensitive adhesive layer made of the pressure-sensitive adhesive resin composition.

BACKGROUND OF THE INVENTION

In recent years, the sizes and thicknesses of appliances are being reduced with progress in the field of electronics. As a result, various pressure-sensitive adhesives for use in such appliances have come to be required to have various properties. In particular, there is a growing desire for heat resistance. This is because the size and thickness reductions in appliances have resulted in considerable heat buildup. Although various measures for removing generated heat are being investigated, various pressure-sensitive adhesives are required to have further improved heat resistance.

Silicone pressure-sensitive adhesives have excellent heat resistance. However, the silicone pressure-sensitive adhesives are highly expensive and are unsuitable for general applications. Consequently, the heat resistance of inexpensive acrylic pressure-sensitive adhesives is expected to be improved.

Acrylic pressure-sensitive adhesives have excellent transparency, and the pressure-sensitive adhesive properties thereof can be easily controlled by changing the composition of the constituent monomers. Acrylic pressure-sensitive adhesives hence have conventionally been applied to many pressure-sensitive adhesive products and other adhesive products.

With respect to investigations for improving the heat resistance of acrylic pressure-sensitive adhesives, a technique in which an alicyclic acrylic monomer is introduced has been proposed (for example, patent document 1). Although this technique attains excellent pressure-sensitive adhesiveness to nonpolar substrates such as polyolefins, the technique is not so effective in improving heat resistance.

Furthermore, a technique in which an acrylamide monomer or the like is copolymerized to improve heat resistance has been proposed (for example, patent document 2). Although this technique brings about excellent reworkability, the pressure-sensitive adhesive has a heat resistance temperature of about 120° C. at most and has insufficient heat resistance in the field of electronics.

Patent Document 1: JP-A-2008-133408
Patent Document 2: JP-A-2008-308548

SUMMARY OF THE INVENTION

An object of the invention is to provide an acrylic pressure-sensitive adhesive resin composition which has excellent heat resistance while retaining the excellent properties including adhesiveness and transparency which are possessed by acrylic pressure-sensitive adhesives.

The present inventors diligently made investigations on the problems described above. As a result, the inventors have found that an organic-inorganic hybrid polymer synthesized from (a) fine silica particles, (b) a siloxane, (c) a trialkoxysilane, and (d) a (meth)acrylic monomer has improved heat resistance while retaining intact adhesiveness and transparency. The invention has been thus completed. Namely, the invention relates to the following items.

(1) An acrylic pressure-sensitive adhesive resin composition (hereinafter often referred to as "pressure-sensitive adhesive resin composition of the invention") including an organic-inorganic hybrid polymer synthesized from the following (a) to (d):

(a) fine silica particles having silanol groups on a surface thereof;

(b) a siloxane having at least one selected from a group consisting of an alkoxysilyl group and a silanol group at a molecular end thereof;

(c) a trialkoxysilane represented by the following general formula (I); and (d) a (meth)acrylic monomer,

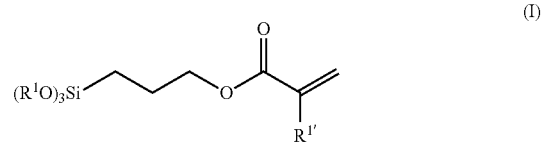

(I)

in which $R^1$ represents a $C_{1-6}$ alkyl group, and $R^{1'}$ represents a hydrogen atom or a methyl group.

(2) The acrylic pressure-sensitive adhesive resin composition according to (1), in which the (a) fine silica particles are colloidal silica which has an average primary-particle diameter of 1 to 100 nm and a pH of 2 to 4 or of 8 to 10.

(3) The acrylic pressure-sensitive adhesive resin composition according to (1) or (2), in which the (b) siloxane includes at least one selected from the group consisting of a siloxane having, at a molecular end thereof, an alkoxysilyl group in an amount of 10% by weight or more based on the whole molecule and a siloxane having, at a molecular end thereof, a silanol group in an amount of 10% by weight or less based on the whole molecule.

(4) The acrylic pressure-sensitive adhesive resin composition according to any one of (1) to (3), in which the siloxane having an alkoxysilyl group at a molecular end thereof has a weight-average molecular weight of 100 to 6,000.

(5) The acrylic pressure-sensitive adhesive resin composition according to any one of (1) to (3), in which the siloxane having a silanol group at a molecular end thereof has a weight-average molecular weight of 300 to 3,000.

(6) The acrylic pressure-sensitive adhesive resin composition according to any one of (1) to (5), wherein the (a) fine silica particles and the (b) siloxane form a polysiloxane.

(7) The acrylic pressure-sensitive adhesive resin composition according to any one of (1) to (6), in which the (d) (meth)acrylic monomer is represented by the following general formula (II):

$$CH_2=C(R^2)COOR^3 \qquad (II)$$

in which $R^2$ represents a hydrogen atom or a methyl group, and $R^3$ represents a hydrocarbon group having 2 to 14 carbon atoms.

(8) The acrylic pressure-sensitive adhesive resin composition according to any one of (1) to (7), in which the (c) trialkoxysilane and the (d) (meth)acrylic monomer form an acrylic copolymer.

(9) The acrylic pressure-sensitive adhesive resin composition according to any one of (1) to (8), in which (e) a carboxyl-containing monomer is further included as a comonomer ingredient of an acrylic copolymer, and the (e) carboxyl-containing monomer, the (c) trialkoxysilane, and the (d) (meth)acrylic monomer form an acrylic copolymer.

(10) The acrylic pressure-sensitive adhesive resin composition according to any one of (1) to (9), in which the organic-inorganic hybrid polymer is a copolymer constituted of a polysiloxane formed from the (a) fine silica particles and the (b) siloxane and an acrylic copolymer formed from at least the (c) trialkoxysilane and the (d) (meth)acrylic monomer, the polysiloxane and the acrylic copolymer being bonded with each other through siloxane bonds.

(11) A pressure-sensitive adhesive sheet or pressure-sensitive adhesive tape (hereinafter often referred to as "pressure-sensitive adhesive sheet or pressure-sensitive adhesive tape of the invention") which includes a substrate or a separator and, formed thereon, a layer including the acrylic pressure-sensitive adhesive resin composition according to any one of (1) to (10).

The pressure-sensitive adhesive resin composition of the invention and the pressure-sensitive adhesive sheet and pressure-sensitive adhesive tape each using the composition can retain adhesiveness and transparency even after having been stored under high-temperature conditions, and have excellent heat resistance.

DETAILED DESCRIPTION OF THE INVENTION

The pressure-sensitive adhesive resin composition of the invention includes an organic-inorganic hybrid polymer synthesized from the following (a) to (d):

(a) fine silica particles having silanol groups on a surface thereof;

(b) a siloxane having at least one selected from a group consisting of an alkoxysilyl group and a silanol group at a molecular end thereof;

(c) a trialkoxysilane represented by the following general formula (I); and (d) a (meth)acrylic monomer,

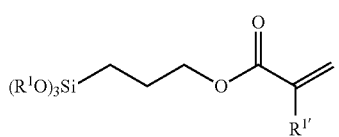

(I)

In formula (I), $R^1$ represents a $C_{1-6}$ alkyl group, and $R^{1'}$ represents a hydrogen atom or a methyl group.

The hybrid polymer in the invention may further contain as a comonomer ingredient, (e) a carboxyl-containing monomer.

The hybrid polymer in the invention is an acrylic/siloxane copolymer which is constituted of a polysiloxane and an acrylic copolymer bonded therewith through siloxane bonds. Specifically, the polysiloxane is formed from the (a) fine silica particles and the (b) siloxane. Meanwhile, the (c) trialkoxysilane is copolymerized with the (d) (meth)acrylic monomer to thereby form an acrylic copolymer having trialkoxysilyl groups. The trialkoxysilyl groups in the acrylic copolymer react with alkoxysilyl/silanol groups of the polysiloxane, and the polysiloxane is thus bonded with the acrylic copolymer through siloxane bonds, thereby synthesizing the hybrid polymer according to the invention.

The ingredients will be separately explained below.

[(a) Fine Silica Particles]

The (a) fine silica particles have silanol groups on the surface thereof. Examples of the (a) fine silica particles include colloidal silica.

The average primary-particle diameter of the (a) fine silica particles is preferably in the range of 1 to 100 nm, more preferably in the range of 1 to 70 nm, especially preferably in the range of 1 to 40 nm. In the case where the average primary-particle diameter thereof is less than 1 nm, the pressure-sensitive adhesive resin composition tends to have poor adhesiveness and poor heat resistance. Conversely, in the case where the average primary-particle diameter thereof exceeds 100 nm, the pressure-sensitive adhesive resin composition tends to have an increased haze and poor transparency. The term "average primary-particle diameter" in the invention means the volume-average primary-particle diameter determined with a dynamic light-scattering type particle size distribution analyzer (e.g., Nanotrac UPA Series; manufactured by Nikkiso Co., Ltd.).

Although the (a) fine silica particles are not particularly limited in particle size distribution, it is preferred that the (a) fine silica particles should have a narrow particle size distribution. It is more preferred that the (a) fine silica particles should be ones in which the primary particles are monodispersed in the state of being dispersed without aggregating.

The (a) fine silica particles are usually used as an aqueous dispersion, and the solid concentration thereof is not particularly limited. It is, however, preferred that the dispersion should have a high concentration. Specifically, the solid concentration thereof is generally 10% by weight or more, preferably 20% by weight or more, from the standpoints of even dispersibility in the (d) (meth)acrylic monomer and the heat resistance of the pressure-sensitive adhesive resin composition to be obtained. There is no particular upper limit on the solid concentration of the aqueous dispersion of the (a) fine silica particles. However, the solid concentration thereof is generally 50% by weight or less, preferably 40% by weight or less.

It is preferred that the surface of the (a) fine silica particles should have undergone no surface treatment. It is also preferred that the pH of the surface of the particles and the pH of the aqueous dispersion of the fine silica particles should each be in an acidic range or in a basic range. Specifically, it is preferred that the pH values thereof should be in the range of 2 to 4 (preferably 2 to 3) or in the range of 8 to 10 (preferably 9 to 10). In the case where the pH values thereof are less than 2 or exceeding 10, there is a tendency that the reaction rate cannot be controlled and gelation occurs during the synthesis of the hybrid polymer. Conversely, in the case where the pH values thereof is higher than 4 but less than 8, there is a tendency that the reaction does not proceed sufficiently and gives a hybrid polymer having an insufficient molecular weight. Consequently, the resultant solution tends to have too low a viscosity and be difficult to apply to substrates, etc.

The (a) fine silica particles to be used may be a commercial product. Examples of the commercial product include the following.

Examples of commercial products in which the pH of the particle surface and the pH of the aqueous fine-silica-particle dispersion are in an acidic range include "Snowtex OXS", "Snowtex OS", "Snowtex O", "Snowtex O-40", "Snowtex OL", "Snowtex OUP", "Snowtex PS-SO", and "Snowtex PS-MO", all manufactured by Nissan Chemical Industries, Ltd.

Examples of commercial products in which the pH of the particle surface and the pH of the aqueous fine-silica-particle dispersion are in a basic range include "Snowtex XS", "Snowtex S", "Snowtex 20", "Snowtex 30", "Snowtex 40", "Snowtex 50", "Snowtex N", "Snowtex NXS", "Snowtex 20L", "Snowtex OL", "Snowtex XL", "Snowtex ZL", "Snowtex UP", "Snowtex PS-S", and "Snowtex PS-M", all manufactured by Nissan Chemical Industries, Ltd.

[(b) Siloxane]

The (b) siloxane has, at a molecular end thereof, at least one selected from the group consisting of an alkoxysilyl group and a silanol group. Examples of the (b) siloxane include chain, cyclic, or network organosiloxanes.

The weight-average molecular weight (Mw) of the (b) siloxane having an alkoxysilyl group at a molecular end thereof is generally in the range of 100 to 6,000, preferably in the range of 100 to 4,000, especially preferably in the range of 100 to 3,000. In the case where the weight-average molecular weight thereof is less than 100, there is a tendency that the number of functional groups which take part in the reaction is insufficient and this siloxane is less apt to react sufficiently. Conversely, in the case where the weight-average molecular weight thereof exceeds 6,000, self-condensation reaction tends to occur preferentially within the (b) siloxane before the (a) fine silica particles react with the (b) siloxane. There is hence a possibility that the (a) fine silica particles might be apt to aggregate and the polysiloxane obtained is milk-white. The term "weight-average molecular weight (Mw)" in the invention means the molecular weight determined by the following method using gel permeation chromatography (GPC).

(Method of Determining Weight-Average Molecular Weight (Mw))

About 10 mg of a sample is taken out of a polymer to be examined, and is dissolved in special-grade THF to obtain a 0.1% THF solution. This solution is filtered through a 0.45-μm filter to prepare a sample solution. Using a calibration curve of standard polystyrene, the molecular weight of the sample is determined through a calculation for the standard polystyrene.

(Measuring Conditions)

Apparatus: HLC 8120 GPC (manufactured by Tosoh Corp.)

Columns: G7000HXL+GMHXL+GMHXL (manufactured by Tosoh Corp.)

Column temperature: 40° C.

Eluent: special-grade THF

Flow rate: 0.8 mL/min

The alkoxysilyl group in the (b) siloxane having an alkoxysilyl group at a molecular end thereof is not particularly limited. However, a $C_{1-6}$ alkoxysilyl group is preferred. Examples thereof include methoxysilyl, ethoxysilyl, propoxysilyl, and butoxysilyl. Of these, methoxysilyl and ethoxysilyl are preferred from the standpoint of reactivity.

The amount of the alkoxysilyl group in the (b) siloxane having an alkoxysilyl group at a molecular end thereof is not particularly limited. However, the amount thereof based on the whole molecule is generally 10% by weight or more, preferably in the range of 15 to 46% by weight, especially preferably in the range of 20 to 46% by weight. In the case where the amount of the alkoxysilyl group is less than 10% by weight based on the whole molecule, there is a possibility that reaction within siloxane units or between siloxane units might occur preferentially to cause aggregation of the (a) fine silica particles. When the amount thereof exceeds 46% by weight, there are cases where the resultant polysiloxane has too high a degree of crosslinking and is apt to gel. It is, however, a matter of course that the amount of the alkoxysilyl group may exceed 46% by weight unless gelation occurs. Incidentally, the amount of the alkoxysilyl group is determined from a weight loss measured in heating from room temperature (10-30° C.) to 300° C. using a differential weight loss measuring device (TGA).

In the (b) siloxane having an alkoxysilyl group at a molecular end thereof, silicon-bonded organic groups other than the alkoxysilyl group are not particularly limited. Examples thereof include halogen-substituted or unsubstituted $C_{1-6}$ alkyl groups represented by methyl, ethyl, propyl, 3,3,3-trifluoropropyl, and 3-chloropropyl; cycloalkyl groups represented by cyclopentyl and cyclohexyl; aryl groups represented by phenyl and xylyl; aralkyl groups represented by benzyl, phenethyl, and 3-phenylpropyl; and hydroxy. From the standpoint of reactivity with the (a) fine silica particles, methyl is preferred.

The (b) siloxane having an alkoxysilyl group at a molecular end thereof may be a commercial product. Examples of the commercial product include "KC89" (Mw, about 400; methoxysilyl group amount, 46% by weight), "KR500" (Mw, about 1,000; methoxysilyl group amount, 28% by weight), "X-40-9225" (Mw, about 3,000; methoxysilyl group amount, 24% by weight), and "X-40-9246" (Mw, about 5,000; methoxysilyl group amount, 10% by weight), all manufactured by Shin-Etsu Chemical Co., Ltd.

The weight-average molecular weight (Mw) of the (b) siloxane having a silanol group at a molecular end thereof is generally in the range of 300 to 3,000, preferably in the range of 300 to 2,000, especially preferably in the range of 300 to 1,000. In the case where the weight-average molecular weight (Mw) thereof is less than 300, the siloxane has too low a molecular weight and this tends to result in a decrease in reaction efficiency. Conversely, in the case where the weight-average molecular weight thereof exceeds 3,000, self-condensation reaction tends to occur preferentially between molecules of the (b) siloxane before the (a) fine silica particles react with the (b) siloxane. There is hence a possibility that the (a) fine silica particles might be apt to aggregate and the polysiloxane obtained is milk-white.

The amount of the silanol group in the (b) siloxane having a silanol group at a molecular end thereof is not particularly limited. However, the amount thereof based on the whole molecule is generally 10% by weight or less, preferably 0.01 to 5% by weight, especially preferably 0.1 to 2% by weight. In the case where the amount of the silanol group exceeds 10% by weight based on the whole molecule, the amount of functional groups which take part in the reaction is too large. There is hence a possibility that a prolonged time period might be required for the reaction to be completed or that the siloxane might have a reduced conversion and this might adversely affect the resin properties of the pressure-sensitive adhesive resin composition. Conversely, in the case where the (b) siloxane has no silanol group, this siloxane, although usable for polysiloxane synthesis therefrom, gives a polysiloxane which is hard. The amount of the silanol group is determined from a weight loss measured in heating from room temperature (0-30° C.) to 300° C. using a differential weight loss measuring device (TGA).

The (b) siloxane having a silanol group at a molecular end thereof is not particularly limited so long as the siloxane satisfies the requirements shown above. Examples of silicon-bonded organic groups other than the silanol group in the (b) siloxane include halogen-substituted or unsubstituted $C_{1-6}$ alkyl groups represented by methyl, ethyl, propyl, 3,3,3-trifluoropropyl, and 3-chloropropyl; cycloalkyl groups represented by cyclopentyl and cyclohexyl; aryl groups represented by phenyl and xylyl; aralkyl groups represented by benzyl, phenethyl, and 3-phenylpropyl; and hydroxy. From the standpoints of reactivity with the (a) fine silica particles and stability, methyl is preferred.

The (b) siloxane having a silanol group at a molecular end thereof may be a commercial product. Examples of the commercial product include "X-21-3153" (Mw, about 300; silanol group amount, about 10% by weight), "X-21-5841" (Mw, about 1,000; silanol group amount, about 3% by weight), and "KF9701" (Mw, about 3,000; silanol group amount, about 1% by weight), all manufactured by Shin-Etsu Chemical Co., Ltd.

A feature of the invention resides in that a polysiloxane is formed from the (a) fine silica particles and the (b) siloxane.

Methods for forming the polysiloxane are not particularly limited, and known methods can be employed. For example, the polysiloxane is synthesized by the following method.

An alcohol which is compatible with water is added as a co-solvent to the (a) fine silica particles to dilute the (a) particles. The pH of the resultant solution is adjusted to a value in the range of 1 to 3. Thereafter, the (b) siloxane is added to the solution and reacted with the (a) fine silica particles. After completion of the reaction, the solvent is distilled off and replaced.

The amount of the (a) fine silica particles to be incorporated for polysiloxane formation is generally in the range of 5 to 40% by weight, preferably in the range of 10 to 40% by weight, especially preferably in the range of 10 to 30% by weight in the polysiloxane. In the case where the amount of the (a) fine silica particles incorporated is less than 5% by weight in the polysiloxane, the resultant polysiloxane is apt to have reduced compatibility with the (d) (meth)acrylic monomer to give a milk-white composition. Conversely, in the case where the amount thereof exceeds 40% by weight, there is a possibility that the polysiloxane might have too high a degree of crosslinking and this polysiloxane might gel or adversely affect the pressure-sensitive adhesive properties of the pressure-sensitive adhesive resin composition.

The amount of the (b) siloxane having an alkoxysilyl group at a molecular end thereof which is to be incorporated for polysiloxane formation is generally in the range of 40 to 95% by weight, preferably in the range of 40 to 90% by weight, especially preferably in the range of 50 to 90% by weight, in the polysiloxane. In the case where the amount of the (b) siloxane incorporated is less than 40% by weight in the polysiloxane, the (b) siloxane has reduced reactivity with the (a) fine silica particles and the (a) fine silica particles are apt to separate from the polysiloxane and aggregate to render the polysiloxane milk-white. Conversely, in the case where the amount thereof exceeds 95% by weight, the polysiloxane is apt to gel and be less compatible with the (d) (meth)acrylic monomer.

The amount of the (b) siloxane having a silanol group at a molecular end thereof which is to be incorporated for polysiloxane formation is generally 40% by weight or less, preferably in the range of 0 to 40% by weight, especially preferably in the range of 5 to 35% by weight, in the polysiloxane. In the case where the amount of the (b) siloxane incorporated is more than 40% by weight in the polysiloxane, the number of functional groups which take part in the reaction is too large. There is hence a possibility that a prolonged time period might be required for the reaction to be completed or that the siloxane might have a reduced conversion and this might adversely affect the pressure-sensitive adhesive properties of the pressure-sensitive adhesive resin composition.

Besides the (a) fine silica particles and the (b) siloxane, optional ingredients may be incorporated for polysiloxane formation. Examples of the optional ingredients include alkoxysilanes (e.g., dimethyldimethoxysilane and tetraethoxysilane). Such optional ingredients may be incorporated in an amount of generally 10% by weight or less, preferably 5% by weight or less, in the polysiloxane.

The amount of the polysiloxane to be incorporated in synthesizing the hybrid polymer according to the invention is generally in the range of 0.01 to 15% by weight, preferably in the range of 0.1 to 15% by weight, especially preferably in the range of 0.1 to 14% by weight, in the hybrid polymer. In the case where the amount of the polysiloxane incorporated is less than 0.01% by weight, the desired effect to be brought about by the polysiloxane is not expected. Conversely, in the case where the amount thereof exceeds 15% by weight, the hybrid polymer is crosslinked at an increased rate and gels at an increased rate, and the hybrid polymer tends to have impaired handleability.

[(c) Trialkoxysilane]

The trialkoxysilane (c) is represented by the following general formula (I).

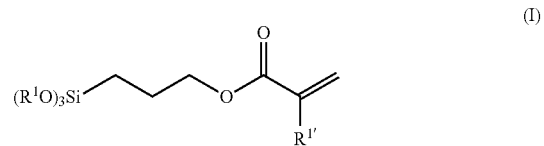

In formula (I), $R^1$ represents a $C_{1-6}$ alkyl group, and $R^{1'}$ represents a hydrogen atom or a methyl group.

The definition of each group in general formula (I) is described below.

The term "$C_{1-6}$ alkyl group", which is represented by $R^1$, means a linear or branched, saturated hydrocarbon group having 1 to 6 carbon atoms. Examples thereof include methyl, ethyl, propyl, isopropyl, butyl, isobutyl, sec-butyl, tert-butyl, pentyl, isopentyl, neopentyl, 1-ethylpropyl, hexyl, isohexyl, 1,1-dimethylbutyl, 2,2-dimethylbutyl, 3,3-dimethylbutyl, and 2-ethylbutyl. Of these, the $C_{1-3}$ alkyl groups are preferred. Methyl is especially preferred.

The $R^1$s may be the same or different, but it is preferred that the $R^1$s should be the same.

$R^{1'}$ represents a hydrogen atom or methyl.

It is preferred that the (c) trialkoxysilane should be a compound in which $R^1$ is a $C_{1-3}$ alkyl group and $R^{1'}$ is a hydrogen atom or methyl.

Examples of the (c) trialkoxysilane include 3-(meth)acryloyloxypropyltrimethoxysilane, 3-(meth)acryloyloxypropyltriethoxysilane, 3-(meth)acryloyloxypropyltripropoxysilane, and 3-(meth)acryloyloxypropyl triisopropoxysilane. Preferred is 3-(meth)acryloyloxypropyltrimethoxysilane from the standpoint of compatibility with the (meth)acrylic monomer (d) and the polysiloxane.

The (c) trialkoxysilane to be used may be a commercial product. Examples of the commercial product include "KBM-5103", "KBM-503", "KBE-5103", and "KBE-503", all manufactured by Shin-Etsu Chemical Co., Ltd.

The amount of the (c) trialkoxysilane to be incorporated in synthesizing the hybrid polymer according to the invention is generally in the range of 0.001 to 0.1% by weight, preferably in the range of 0.01 to 0.1% by weight, especially preferably in the range of 0.03 to 0.1% by weight, in the hybrid polymer. In the case where the amount of the (c) trialkoxysilane incorporated is less than 0.001% by weight, there is a possibility that the acrylic copolymer might have poor compatibility with the polysiloxane, resulting in an opacification phenomenon due to phase separation. In the case where the amount thereof exceeds 0.1% by weight, there is a possibility that the hybrid polymer might have too high a gel content, resulting in a decrease in the pressure-sensitive adhesive properties of the pressure-sensitive adhesive resin composition.

[(d) (Meth)Acrylic Monomer]

The (d) (meth)acrylic monomer is not particularly limited so long as the (d) monomer is copolymerizable with the (c) trialkoxysilane. Examples thereof include compounds represented by the following general formula (II).

$$CH_2=C(R^2)COOR^3 \quad (II)$$

In formula (II), $R^2$ represents a hydrogen atom or a methyl group, and $R^3$ represents a hydrocarbon group having 2 to 14 carbon atoms.

The definition of each group in general formula (II) is described below.

$R^2$ represents a hydrogen atom or methyl.

Examples of the "hydrocarbon group having 2 to 14 carbon atoms" which is represented by $R^3$ include $C_{2-14}$ alkyl groups such as ethyl, propyl, isopropyl, butyl, isobutyl, sec-butyl, tert-butyl, pentyl, isopentyl, neopentyl, 1,2-dimethylpropyl, 1-ethylpropyl, hexyl, isohexyl, 1,2,2-trimethylpropyl, 1,1-dimethylbutyl, 2,2-dimethylbutyl, 3,3-dimethylbutyl, 2-ethylbutyl, heptyl, isoheptyl, octyl, isooctyl, 2-ethylhexyl, nonyl, isononyl, decyl, isodecyl, undecyl, isoundecyl, dodecyl, isododecyl, tridecyl, isotridecyl, tetradecyl, and isotetradecyl; $C_{3-10}$ cycloalkyl groups such as cyclopropyl, cyclobutyl, cyclopentyl, cyclohexyl, cycloheptyl, and cyclooctyl; $C_{7-14}$ aralkyl groups such as benzyl, phenethyl, and naphthylmethyl; and bornyl and isobornyl. Preferred are $C_{2-14}$ alkyl groups. More preferred are $C_{4-9}$ alkyl groups. In the case where the hydrocarbon group has less than 2 carbon atoms, there is a possibility that the resultant polymer might be hard to reduce pressure-sensitive adhesive properties. Conversely, in the case where the number of carbon atoms thereof exceeds 14, there is a possibility that the resultant polymer might be a solid having liquid crystallinity and be unusable as a pressure-sensitive adhesive.

It is preferred that the (d) (meth)acrylic monomer should be a compound in which $R^2$ is a hydrogen atom or methyl and $R^3$ is a $C_{2-14}$ alkyl group (preferably, a $C_{4-9}$ alkyl group).

Examples of the (d) (meth)acrylic monomer include ethyl (meth)acrylate, propyl (meth)acrylate, isopropyl (meth)acrylate, butyl (meth)acrylate, isobutyl (meth)acrylate, sec-butyl (meth)acrylate, tert-butyl (meth)acrylate, pentyl (meth)acrylate, isopentyl (meth)acrylate, neopentyl (meth)acrylate, 1,2-dimethylpropyl (meth)acrylate, 1-ethylpropyl (meth)acrylate, hexyl (meth)acrylate, isohexyl (meth)acrylate, 1,2,2-trimethylpropyl (meth)acrylate, 1,1-dimethylbutyl (meth)acrylate, 2,2-dimethylbutyl (meth)acrylate, 3,3-dimethylbutyl (meth)acrylate, 2-ethylbutyl (meth)acrylate, heptyl (meth)acrylate, octyl (meth)acrylate, isooctyl (meth)acrylate, 2-ethylhexyl (meth)acrylate, nonyl (meth)acrylate, isononyl (meth)acrylate, decyl (meth)acrylate, isodecyl (meth)acrylate, undecyl (meth)acrylate, isoundecyl (meth)acrylate, dodecyl (meth)acrylate, isododecyl (meth)acrylate, tridecyl (meth)acrylate, isotridecyl (meth)acrylate, tetradecyl (meth)acrylate, isotetradecyl (meth)acrylate, cyclohexyl (meth)acrylate, benzyl (meth)acrylate, and isobornyl (meth) acrylate. Preferred of these from the standpoint of compatibility with the polysiloxane are ethyl acrylate, butyl acrylate, and 2-ethylhexyl acrylate. Especially preferred is butyl acrylate. Those compounds may be used alone or in combination of two or more thereof.

The amount of the (d) (meth)acrylic monomer to be incorporated in synthesizing the hybrid polymer according to the invention is generally in the range of 60 to 99.9% by weight, preferably in the range of 65 to 99.9% by weight, especially preferably in the range of 65 to 99% by weight, in the hybrid polymer. In the case where the amount of the (d) (meth) acrylic monomer incorporated is less than 60% by weight, the hybrid polymer is less apt to exhibit sufficient pressure-sensitive adhesive properties. In the case where the amount thereof exceeds 99.9% by weight, the desired effect to be brought about by the polysiloxane is not expected.

[(e) Carboxyl-Containing Monomer]

In synthesizing the hybrid polymer according to the invention, (e) a carboxyl-containing monomer may be further included as a comonomer ingredient of the acrylic copolymer. The (e) carboxyl-containing monomer is not particularly limited so long as the monomer is polymerizable with the (c) trialkoxysilane and the (d) (meth)acrylic monomer. Examples thereof include (meth)acrylic acid, itaconic acid, maleic acid, carboxyethyl (meth)acrylate, carboxypentyl (meth)acrylate, fumaric acid, crotonic acid, and isocrotonic acid.

The content of the (e) carboxyl-containing monomer in the hybrid polymer according to the invention is generally in the range of 0.01 to 15% by weight, preferably in the range of 0.01 to 10% by weight, especially preferably in the range of 0.1 to 10% by weight in the hybrid polymer. In the case where the content thereof is less than 0.01% by weight, the hybrid polymer as a pressure-sensitive adhesive tends to have insufficient cohesive force. In the case where the content thereof exceeds 15% by weight, the pressure-sensitive adhesive resin composition tends to be hard and have poor pressure-sensitive adhesive properties especially at low temperatures.

The hybrid polymer according to the invention may be synthesized using other polymerizable monomers in addition to the ingredients (a) to (e).

Examples of the other polymerizable monomers include epoxy-group-containing monomers (e.g., glycidyl (meth) acrylate, methylglycidyl (meth)acrylate, and 3,4-epoxycyclohexylmethyl (meth)acrylate), hydroxy-containing monomers (e.g., hydroxyalkyl (meth)acrylates in which the alkyl group is a $C_{2-6}$ alkyl group such as ethyl, propyl, butyl, or hexyl), cyano-containing monomers (e.g., (meth)acrylonitrile), vinyl ester monomers (e.g., vinyl acetate), aromatic vinyl monomers (e.g., styrene), amide-group-containing monomers (e.g., (meth)acrylamide), amino-containing monomers, imide-group-containing monomers (e.g., N-(meth)acryloylmorpholine), vinyl ether monomers, (meth) acrylic acid compounds containing a siloxane group, and copolymerizable vinyl compounds. These compounds may be used alone or in combination of two or more thereof.

The content of such other polymerizable monomers in the hybrid polymer according to the invention is generally 30% by weight or less, preferably 20% by weight or less, especially preferably 10% by weight or less, based on all constituent monomer of the hybrid polymer. There is no particular lower limit on the content thereof. However, the content thereof is generally 3% by weight or more, preferably 5% by weight or more.

With respect to methods for synthesizing the hybrid polymer according to the invention, a known polymerization method can be suitably selected from solution polymerization, bulk polymerization, emulsion polymerization, various radical polymerization techniques, and the like. The copolymer may be any of a random copolymer, block copolymer, graft copolymer, etc.

In the solution polymerization, use is made, for example, of ethyl acetate, toluene, or the like as a polymerization solvent. In a specific example of the solution polymerization, azobisisobutyronitrile is added as a polymerization initiator, for example, in an amount of 0.01 to 1 part by weight per 100 parts by weight of all constituent monomers for the hybrid polymer and the reaction is conducted generally at about 50 to 70° C. for about 8 to 30 hours in a stream of an inert gas such as nitrogen.

A polymerization initiator, a chain-transfer agent, an emulsifying agent, etc. are used in the radical polymerization, and these ingredients are not particularly limited and are suitably selected and used.

Examples of the polymerization initiator to be used for synthesizing the hybrid polymer according to the invention include azo initiators such as 2,2'-azobisisobutyronitrile, 2,2'-azobis(2-amidinopropane)dihydrochloride, 2,2'-azobis[2-(5-methyl-2-imidazolin-2-yl)propane]dihydrochloride, 2,2'-azobis(2-methylpropionamidine)disulfate, 2,2'-azobis(N,N'-dimethyleneisobutylamidine), and 2,2'-azobis[N-(2-carboxyethyl)-2-methylpropionamidine]hydrate (VA-057, manufactured by Wako Pure Chemical Industries, Ltd.); persulfates such as potassium persulfate and ammonium persulfate; peroxide type initiators such as di(2-ethylhexyl) peroxydicarbonate, di(4-t-butylcyclohexyl) peroxydicarbonate, di-sec-butyl peroxydicarbonate, t-butyl peroxyneodecanoate, t-hexyl peroxypivalate, t-butyl peroxypivalate, dilauroyl peroxide, di-n-octanoyl peroxide, 1,1,3,3-tetramethylbutyl peroxy-2-ethylhexanoate, di(4-methylbenzoyl) peroxide, dibenzoyl peroxide, t-butyl peroxyisobutyrate, 1,1-di(t-hexylperoxy)cyclohexane, t-butyl hydroperoxide, and hydrogen peroxide; and redox initiators including a peroxide and a reducing agent in combination, such as a combination of a persulfate and sodium hydrogen sulfite and a combination of a peroxide and sodium ascorbate. However, the polymerization initiator is not limited to these examples.

One of such polymerization initiators may be used alone, or a mixture of two or more thereof may be used. However, the total content of the polymerization initiators is preferably in the range of about 0.005 to 1 part by weight, more preferably in the range of about 0.02 to 0.5 parts by weight, per 100 parts by weight of all constituent monomers for the hybrid polymer.

In the case where a peroxide was used as a polymerization initiator, the peroxide which remains without being used for the polymerization reaction can be used for crosslinking reaction of the hybrid polymer. In this case, use may be made of a method in which the amount of the residual peroxide is quantity determined and the peroxide is added again according to need to regulate the peroxide amount to a given value, before the peroxide is used.

The weight-average molecular weight (Mw) of the hybrid polymer according to the invention is generally 10,000 to 10,000,000, preferably 100,000 to 5,000,000, especially preferably 500,000 to 3,000,000.

The content of the hybrid polymer according to the invention in the pressure-sensitive adhesive resin composition of the invention is generally 80 to 99.9% by weight, preferably 85 to 99.9% by weight, especially preferably 90 to 99.9% by weight.

Known additives may be incorporated into the pressure-sensitive adhesive resin composition of the invention. For example, a powder of a colorant, pigment, or the like, dye, surfactant, plasticizer, tackifier, surface lubricant, leveling agent, softener, antioxidant, aging inhibitor, light stabilizer, ultraviolet absorber, polymerization inhibitor, inorganic or organic filler, metal powder, particulate substance, flaky substance, and the like can be suitably added according to intended uses. Furthermore, a redox system including a reducing agent may be employed so long as the reaction can be controlled.

The pressure-sensitive adhesive sheet or pressure-sensitive adhesive tape of the invention includes a layer including the pressure-sensitive adhesive resin composition of the invention (hereinafter often referred to simply as "pressure-sensitive adhesive layer") formed on a substrate or separator.

The thickness of the pressure-sensitive adhesive layer is preferably 2 to 500 µm, more preferably 5 to 100 µm.

Methods for forming the pressure-sensitive adhesive layer on a substrate or separator are not particularly limited. For example, the pressure-sensitive adhesive sheet or tape is produced by a method including applying the pressure-sensitive adhesive resin composition of the invention to a release-treated separator or the like, drying the composition to remove the polymerization solvent, etc., and transferring the resultant pressure-sensitive adhesive layer to a substrate, or by a method in which the pressure-sensitive adhesive resin composition is applied to a substrate and then dried to remove the polymerization solvent, etc. and thereby forming a pressure-sensitive adhesive layer on the substrate. In the case where the pressure-sensitive adhesive resin composition is to be applied to a substrate to produce, for example, an optical member having a pressure-sensitive adhesive, one or more solvents other than the polymerization solvent may be newly added to the pressure-sensitive adhesive resin composition in order that the composition can be evenly applied on the substrate.

Examples of the solvents other than the polymerization solvent which are capable of being added to the pressure-sensitive adhesive resin composition include acetone, methyl ethyl ketone, ethyl acetate, tetrahydrofuran, dioxane, cyclohexanone, n-hexane, toluene, xylene, methanol, ethanol, n-propanol, isopropanol, and water. One of these solvents may be used alone, or a mixture of two or more thereof may be used.

Examples of the substrate or separator include plastic substrates such as polyester films made of poly(ethylene terephthalate) (PET) or the like, porous materials such as paper and nonwoven fabric, and optical members.

The plastic substrates are not particularly limited so long as the plastic is a material formable into a sheet or film shape. Examples thereof include films of polyolefins such as polyethylene, polypropylene, poly(1-butene), poly(4-methyl-1-pentene), ethylene/propylene copolymers, ethylene/1-butene copolymers, ethylene/vinyl acetate copolymers, ethylene/ethyl acrylate copolymers, and ethylene/vinyl alcohol copolymers; films of polyesters such as poly(ethylene terephthalate) (PET), poly(ethylene naphthalate), and poly(butylene terephthalate); polyacrylate films, polystyrene films, and films of polyamides such as nylon 6, nylon 6,6, and partly aromatic polyamides; and poly(vinyl chloride) films, poly(vinylidene chloride) films, and polycarbonate films.

The plastic substrates can be subjected, according to need, to a releasability-imparting and antifouling treatment with a silicone, fluorochemical, long-chain alkyl type, or fatty acid amide type release agent or with a silica powder or the like, an adhesion-facilitating treatment such as an acid treatment, alkali treatment, priming, corona treatment, plasma treatment, or ultraviolet treatment, or an antistatic treatment such as coating-fluid application, mixing, or vapor deposition.

The thickness of the substrate or separator is generally about 4 to 100 µm, preferably about 4 to 50 µm.

For forming the pressure-sensitive adhesive layer, known techniques in use for producing pressure-sensitive adhesive sheets may be used. Examples of the known techniques include roll coating, kiss-roll coating, gravure coating, reverse-roll coating, brush-roll coating, spray coating, diproll coating, bar coating, knife coating, air-knife coating, curtain coating, lip coating, and extrusion coating with a die coater or the like.

The pressure-sensitive adhesive layer can be obtained also by using a production process including a step in which a layer including the pressure-sensitive adhesive resin composition of the invention is formed on one or each surface of a substrate and a step in which the layer including the pressure-sensitive adhesive resin composition is crosslinked with a peroxide. Use of this production process makes it possible to obtain a pressure-sensitive adhesive layer which has the excellent pressure-sensitive adhesive properties described above and which, in particular, has excellent durability that prevents the pressure-sensitive adhesive layer from lifting or peeling off in a heat treatment or high-humidity treatment even when thin.

The surface of the pressure-sensitive adhesive layer may be subjected to an adhesion-facilitating treatment such as a corona treatment or a plasma treatment.

In such cases where the pressure-sensitive adhesive is exposed on a surface, the pressure-sensitive adhesive layer may be kept being protected with a releasant-treated sheet (e.g., a release sheet, separator, or release liner) until the pressure-sensitive adhesive sheet or tape is subjected to practical use.

Examples of the material constituting the release-treated sheet include suitable film materials such as films of plastics such as polyethylene, polypropylene, and poly(ethylene terephthalate) (PET), porous materials such as paper, fabric, and nonwoven fabric, nets, foam sheets, metal foils, and laminates thereof. However, plastic films are suitable from the standpoint of the excellent surface smoothness thereof.

Such plastic films are not particularly limited so long as the films can protect the pressure-sensitive adhesive layer. Examples thereof include polyethylene films, polypropylene films, polybutene films, polybutadiene films, polymethylpentene films, poly(vinyl chloride) films, vinyl chloride copolymer films, poly(ethylene terephthalate) (PET) films, poly(butylene terephthalate) films, polyurethane films, and ethylene/vinyl acetate copolymer films.

The thickness of the release-treated sheet is generally about 5 to 200 μm, preferably about 5 to 100 μm.

The release-treated sheet can be subjected, according to need, to a releasability-imparting and antifouling treatment with a silicone, fluorochemical, long-chain alkyl-based, or aliphatic acid amide-based release agent or with a silica powder or the like or to an antistatic treatment such as coating-fluid application, mixing, or vapor deposition. In particular, by suitably subjecting the surface of the release-treated sheet to a release treatment such as a silicone treatment, fluorochemical treatment, or treatment with a long-chain alkyl-based release agent, releasability from the pressure-sensitive adhesive layer can be further enhanced.

Incidentally, in the production process described above, the release-treated sheet by itself can be used as a separator for the pressure-sensitive adhesive sheet or the like or for an optical member having a pressure-sensitive adhesive. Thus, the steps can be simplified.

The adhesive force of the pressure-sensitive adhesive sheet or pressure-sensitive adhesive tape of the invention is evaluated by cutting a sample piece having a width of 10 mm and a length of 100 mm out of the pressure-sensitive adhesive sheet or pressure-sensitive adhesive tape, transferring the sample piece to a glass plate, subsequently applying the sample piece to an adherend (e.g., a poly(ethylene terephthalate) (PET) film or a polyimide (PI) film) in a 23° C. atmosphere by rolling a 2-kg roller forward and backward once thereon, storing the resultant test sample under high-temperature conditions (for example, 1-hour storage in a 150° C. oven, 72-hour storage in a 150° C. oven, 1-hour storage in a 200° C. oven, 72-hour storage in a 200° C. oven, or 1-hour storage in a 250° C. oven), and then examining the test sample for peel adhesive force with a Tensilon type peel tester under the conditions of a peel angle of 90° and a peel rate of 300 mm/min.

It is preferred that the adhesive force of the pressure-sensitive adhesive sheet or pressure-sensitive adhesive tape of the invention should be such that the adhesive force thereof as measured after the high-temperature storage is 90% or more of the initial adhesive force regardless of the adherend (regardless of whether the adherend is, for example, a PET film or a PI film). It is more preferred that the adhesive force thereof measured after the high-temperature storage is equal to or higher than the initial adhesive force.

The transparency of the pressure-sensitive adhesive sheet or pressure-sensitive adhesive tape of the invention is evaluated by cutting a sample piece having a width of 10 mm and a length of 100 mm out of the pressure-sensitive adhesive sheet or pressure-sensitive adhesive tape, transferring the sample piece to a glass plate, subsequently applying the sample piece to an adherend (e.g., a poly(ethylene terephthalate) (PET) film or a polyimide (PI) film) in a 23° C. atmosphere by rolling a 2-kg roller forward and backward once thereon, storing the resultant test sample under high-temperature conditions (for example, 72-hour storage in a 150° C. oven or 72-hour storage in a 200° C. oven), and then examining the test sample for transmittance at 450 nm with a spectrophotometer (e.g., U-4100, manufactured by Hitachi Ltd.).

It is preferred that the transparency of the pressure-sensitive adhesive sheet or pressure-sensitive adhesive tape of the invention should be such that the transmittance thereof as measured after the high-temperature storage is not considerably lower than the initial transmittance (measured before the high-temperature storage) regardless of the adherend (regardless of whether the adherend is, for example, a PET film or a PI film). Specifically, it is preferred that the pressure-sensitive adhesive sheet or tape after the high-temperature storage should retain at least 50% (preferably at least 70%) of the initial transmittance.

EXAMPLES

The invention will be explained below in detail by reference to Examples and Comparative Examples, but the Examples and the Comparative Examples should not be construed as limiting the invention in any way. Hereinafter, "parts" and "%" mean "parts by weight" and "% by weight", respectively, unless otherwise indicated.

<Preparation of Polysiloxane Solutions>
Polysiloxane Solution A

Into a vessel equipped with a stirrer, reflux condenser, and nitrogen introduction tube were introduced 5 g of colloidal silica having an average primary-particle diameter of 8 nm (trade name, Snowtex OS; manufactured by Nissan Chemical Industries, Ltd.; solid concentration, 20%; pH of the particle surface and pH of the aqueous fine-silica-particle dispersion, 2.0-4.0), 7.5 g of 2-propanol, and 5 g of 2-methoxyethanol. Concentrated hydrochloric acid was further added to adjust the acidity (pH) of the mixture to 2-3. Subsequently, this reaction mixture was heated to 80° C., and a solution prepared by dissolving 5 g of a siloxane having an alkoxysilyl group at a molecular end thereof (trade name, X-40-9225; manufactured by Shin-Etsu Chemical Co., Ltd.; Mw, about 3,000;

methoxysilyl group amount, 24%; silicon-bonded organic group, methyl) in 5 g of 2-propanol was added dropwise thereto over 1 hour using a dropping funnel. The resultant mixture was further reacted at 80° C. for 2 hours and then cooled to room temperature. The solvent was distilled off under reduced pressure, and ethyl acetate was added to the residue so as to result in a solid concentration of 50%. Thus, polysiloxane solution A was prepared.

Polysiloxane Solution B

The same solution of fine silica particles as that used for the polysiloxane solution A was used and subjected to the same treatment as for the polysiloxane solution A, except that in place of the solution prepared by dissolving 5 g of a siloxane having an alkoxysilyl group at a molecular end thereof (trade name, X-40-9225; manufactured by Shin-Etsu Chemical Co., Ltd.; Mw, about 3,000; methoxysilyl group amount, 24%; silicon-bonded organic group, methyl) in 5 g of 2-propanol, use was made of a solution prepared by dissolving 2.8 g of a siloxane having an alkoxysilyl group at a molecular end thereof (trade name, X-40-9225; manufactured by Shin-Etsu Chemical Co., Ltd.; Mw, about 3,000; methoxysilyl group amount, 24%; silicon-bonded organic group, methyl) and 1.2 g of a siloxane having a silanol group at each of both ends of the molecule (trade name, X-21-3153; manufactured by Shin-Etsu Chemical Co., Ltd.; Mw, about 300, silanol group amount, about 10%; silicon-bonded organic group, methyl) in 4 g of 2-propanol. Thus, polysiloxane solution B was prepared.

Polysiloxane Solution C

The same solution of fine silica particles as that used for the polysiloxane solution A was used and subjected to the same treatment as for the polysiloxane solution A, except that 3.2 g of KR500 (manufactured by Shin-Etsu Chemical Co., Ltd.; Mw, about 1,000; methoxysilyl group amount, 28%; silicon-bonded organic group, methyl) was used as a siloxane having an alkoxysilyl group at a molecular end thereof, in place of the 5 g of X-40-9225 (manufactured by Shin-Etsu Chemical Co., Ltd.; Mw, about 3,000; methoxysilyl group amount, 24%; silicon-bonded organic group, methyl). Thus, polysiloxane solution C was prepared.

Polysiloxane Solution D

Into a vessel equipped with a stirrer, reflux condenser, and nitrogen introduction tube were introduced 5.0 g of colloidal silica having an average primary-particle diameter of 20 nm (trade name, Snowtex O-40; manufactured by Nissan Chemical Industries, Ltd.; solid concentration, 40%; pH of the particle surface and pH of the aqueous fine-silica-particle dispersion, 2.0-4.0), 10.0 g of methanol, and 2.0 g of 2-methoxyethanol. Concentrated hydrochloric acid was added to the mixture to adjust the acidity (pH) thereof to 2-3. Thereafter, this reaction mixture was heated to 60° C. A solution prepared by dissolving 0.5 g of tetraethoxysilane (trade name, TEOS; manufactured by Shin-Etsu Chemical Co., Ltd.) and 1.0 g of dimethyldimethoxysilane (trade name, KBM22; manufactured by Shin-Etsu Chemical Co., Ltd.) in 2.0 g of methanol was added dropwise thereto over 5 minutes using a dropping funnel. The resultant mixture was further reacted at 60° C. for 15 minutes and then cooled to room temperature. The solvent was distilled off under reduced pressure until the weight of the whole liquid decreased to 5 g. Thereafter, 5.0 g of 2-propanol and 5.0 g of tetrahydrofuran were added thereto, and this mixture was stirred to obtain an even solution. Thereto was added dropwise over 20 minutes a solution prepared by dissolving 4.0 g of a siloxane having an alkoxysilyl group at a molecular end thereof (trade name, X-40-9225; manufactured by Shin-Etsu Chemical Co., Ltd.; Mw, about 3,000; methoxysilyl group amount, 24%; silicon-bonded organic group, methyl) in 4.0 g of 2-propanol. The resultant mixture was further reacted at 60° C. for 2 hours and then cooled to room temperature. The solvent was distilled off under reduced pressure, and ethyl acetate was added to the residue so as to result in a solid concentration of 50%. Thus, polysiloxane solution D was prepared.

<Preparation of Pressure-Sensitive Adhesive Resin Composition Solutions>

Example 1

Into a four-necked flask equipped with a stirrer, thermometer, nitrogen gas introduction tube, and condenser were introduced 40 parts of butyl acrylate, 0.4 parts of acrylic acid, 4 parts of polysiloxane solution A (solid concentration, 50%), 0.04 parts of 3-acryloyloxypropyltrimethoxysilane (trade name, KBM-5103; manufactured by Shin-Etsu Chemical Co., Ltd.), 0.01 part of an aluminum-based catalyst (trade name, CAT-AC; manufactured by Shin-Etsu Chemical Co., Ltd.), 0.1 part of 2,2'-azobisisobutyronitrile as a polymerization initiator, and 32 parts of ethyl acetate. While the contents were kept being stirred gently, nitrogen gas was introduced to sufficiently replace the atmosphere within the flask with nitrogen. Thereafter, polymerization reaction was conducted for 10 hours while keeping the liquid temperature within the flask at around 55° C. After completion of the reaction, 88 parts of ethyl acetate was added. Thus, a desired pressure-sensitive adhesive resin composition solution was prepared.

Example 2

Into a four-necked flask equipped with a stirrer, thermometer, nitrogen gas introduction tube, and condenser were introduced 40 parts of butyl acrylate, 0.1 part of acrylic acid, 2 parts of polysiloxane solution B (solid concentration, 50%), 0.03 parts of 3-acryloyloxypropyltrimethoxysilane (trade name, KBM-5103; manufactured by Shin-Etsu Chemical Co., Ltd.), 0.01 part of an aluminum-based catalyst (trade name, CAT-AC; manufactured by Shin-Etsu Chemical Co., Ltd.), 0.1 part of 2,2'-azobisisobutyronitrile as a polymerization initiator, and 30 parts of ethyl acetate. While the contents were kept being stirred gently, nitrogen gas was introduced to sufficiently replace the atmosphere within the flask with nitrogen. Thereafter, polymerization reaction was conducted for 10 hours while keeping the liquid temperature within the flask at around 55° C. After completion of the reaction, 90 parts of ethyl acetate was added. Thus, a desired pressure-sensitive adhesive resin composition solution was prepared.

Example 3

Into a four-necked flask equipped with a stirrer, thermometer, nitrogen gas introduction tube, and condenser were introduced 40 parts of butyl acrylate, 0.4 parts of acrylic acid, 12 parts of polysiloxane solution C (solid concentration, 50%), 0.03 parts of 3-acryloyloxypropyltrimethoxysilane (trade name, KBM-5103; manufactured by Shin-Etsu Chemical Co., Ltd.), 0.01 part of an aluminum-based catalyst (trade name, CAT-AC; manufactured by Shin-Etsu Chemical Co., Ltd.), 0.1 part of 2,2'-azobisisobutyronitrile as a polymerization initiator, and 30 parts of ethyl acetate. While the contents were kept being stirred gently, nitrogen gas was introduced to sufficiently replace the atmosphere within the flask with nitrogen. Thereafter, polymerization reaction was conducted for 10 hours while keeping the liquid temperature within the flask at around 55° C. After completion of the reaction, 90

17 parts of ethyl acetate was added. Thus, a desired pressure-sensitive adhesive resin composition solution was prepared.

Example 4

Into a four-necked flask equipped with a stirrer, thermometer, nitrogen gas introduction tube, and condenser were introduced 40 parts of butyl acrylate, 0.4 parts of acrylic acid, 2 parts of polysiloxane solution D (solid concentration, 50%), 0.03 parts of 3-acryloyloxypropyltrimethoxysilane (trade name, KBM-5103; manufactured by Shin-Etsu Chemical Co., Ltd.), 0.01 part of an aluminum-based catalyst (trade name, CAT-AC; manufactured by Shin-Etsu Chemical Co., Ltd.), 0.1 part of 2,2'-azobisisobutyronitrile as a polymerization initiator, and 30 parts of ethyl acetate. While the contents were kept being stirred gently, nitrogen gas was introduced to sufficiently replace the atmosphere within the flask with nitrogen. Thereafter, polymerization reaction was conducted for 10 hours while keeping the liquid temperature within the flask at around 55° C. After completion of the reaction, 90 parts of ethyl acetate was added. Thus, a desired pressure-sensitive adhesive resin composition solution was prepared.

Comparative Example 1

Into a four-necked flask equipped with a stirrer, thermometer, nitrogen gas introduction tube, and condenser were introduced 40 parts of butyl acrylate, 2 parts of acrylic acid, 0.1 part of 2,2'-azobisisobutyronitrile as a polymerization initiator, and 40 parts of ethyl acetate. While the contents were kept being stirred gently, nitrogen gas was introduced to sufficiently replace the atmosphere within the flask with nitrogen. Thereafter, polymerization reaction was conducted for 10 hours while keeping the liquid temperature within the flask at around 55° C. After completion of the reaction, 80 parts of ethyl acetate was added. Thus, a desired pressure-sensitive adhesive resin composition solution was prepared.

Comparative Example 2

Into a four-necked flask equipped with a stirrer, thermometer, nitrogen gas introduction tube, and condenser were introduced 40 parts of butyl acrylate, 2 parts of 2-hydroxyethyl acrylate, 0.1 part of 2,2'-azobisisobutyronitrile as a polymerization initiator, and 40 parts of ethyl acetate. While the contents were kept being stirred gently, nitrogen gas was introduced to sufficiently replace the atmosphere within the flask with nitrogen. Thereafter, polymerization reaction was conducted for 10 hours while keeping the liquid temperature within the flask at around 55° C. After completion of the reaction, 80 parts of ethyl acetate was added. Thus, a desired pressure-sensitive adhesive resin composition solution was prepared.

18

<Production of Pressure-Sensitive Adhesive Tapes>

Each of the pressure-sensitive adhesive resin composition solutions obtained in Examples 1 to 4 and Comparative Examples 1 and 2 was applied to one surface of a silicone-treated poly(ethylene terephthalate) (PET) film (manufactured by Mitsubishi Chemical Polyester Film Corporation; thickness of 38 μm) and dried at 150° C. for 3 minutes to form a pressure-sensitive adhesive layer having a thickness of 20 μm on a dry basis. Thus, pressure-sensitive adhesive tapes were produced.

<Evaluation of Heat Resistance>

Heat resistance was evaluated by storing each pressure-sensitive adhesive tape under high-temperature conditions and comparing the adhesive force and transparency thereof measured after the storage with the adhesive force and transparency thereof measured before the storage.

The adhesive force and transparency were evaluated in the following manners.

Evaluation of Adhesive Force

Sample pieces having a width of 10 mm and a length of 100 mm were cut out of each pressure-sensitive adhesive tape, and the pressure-sensitive adhesive layers were transferred to a glass plate. Subsequently, these sample pieces were applied to a PET film and a polyimide (PI) film in a 23° C. atmosphere by rolling a 2-kg roller forward and backward once thereon.

Thereafter, the samples applied to a PET film were examined for peel adhesive force with a Tensilon type peel tester under the conditions of a peel angle of 90° and a peel rate of 300 mm/min. The measurement was made before high-temperature storage (initial), after 1-hour storage in a 150° C. oven, after 72-hour storage in a 150° C. oven, and after 1-hour storage in a 200° C. oven.

The samples applied to a PI film were examined for peel adhesive force with the Tensilon type peel tester under the conditions of a peel angle of 90° and a peel rate of 300 mm/min. The measurement was made before high-temperature storage (initial), after 1-hour storage in a 200° C. oven, after 72-hour storage in a 200° C. oven, and after 1-hour storage in a 250° C. oven.

Evaluation of Transparency

The samples applied to a PET film which had been produced in the evaluation of adhesive force were examined for transmittance at 450 nm with a spectrophotometer (U-4100, manufactured by Hitachi Ltd.). The measurement was made before high-temperature storage (initial) and after 72-hour storage in a 150° C. oven.

The samples applied to a PI film which had been produced in the evaluation of adhesive force were examined for transmittance at 450 nm with the spectrophotometer (U-4100, manufactured by Hitachi Ltd.). The measurement was made before high-temperature storage (initial) and after 72-hour storage in a 200° C. oven.

The results thereof are shown in Tables 1 and 2.

TABLE 1

| | (1) Evaluation of Adhesive Force | | | | | | | |
|---|---|---|---|---|---|---|---|---|
| | PET/Glass | | | | PI/Glass | | | |
| | Initial | 150° C./1 h | 150° C./72 h | 200° C./1 h | Initial | 200° C./1 h | 200° C./72 h | 250° C./1 h |
| Example 1 | 11.3 | 14.6 | 14.7 | 15.3 | 18.1 | 18.2 | 17.9 | 20.1 |
| Example 2 | 10.8 | 14.2 | 14.1 | 14.5 | 23.1 | 24.2 | 23.7 | 23.1 |

TABLE 1-continued

| | (1) Evaluation of Adhesive Force | | | | | | | |
|---|---|---|---|---|---|---|---|---|
| | PET/Glass | | | | PI/Glass | | | |
| | Initial | 150° C./1 h | 150° C./72 h | 200° C./1 h | Initial | 200° C./1 h | 200° C./72 h | 250° C./1 h |
| Example 3 | 11.6 | 15.2 | 15.2 | 15.4 | 19.2 | 20.2 | 19.7 | 20.4 |
| Example 4 | 11.1 | 13.9 | 14.2 | 14.7 | 17.3 | 20.6 | 20.5 | 20.1 |
| Comparative Example 1 | 10.2 | 14.5 | 12.2 | 9.8 | 20.1 | 14.2 | 2.1 | 10.5 |
| Comparative Example 2 | 8.9 | 10.5 | 7.3 | 6.1 | 14.3 | 6.2 | peeled off | peeled off | unit: N/20 mm

TABLE 2

| | (2) Evaluation of Transparency | | | |
|---|---|---|---|---|
| | PET/Glass | | PI/Glass | |
| | Initial | 150° C./72 h | Initial | 200° C./72 h |
| Example 1 | 95 | 78 | 45 | 41 |
| Example 2 | 94 | 73 | 44 | 40 |
| Example 3 | 94 | 72 | 45 | 39 |
| Example 4 | 95 | 73 | 44 | 38 |
| Comparative Example 1 | 95 | 11 | 43 | 1 |
| Comparative Example 2 | 95 | 6 | 46 | unable to be measured | unit: %

According to Examples 1 to 4, pressure-sensitive adhesive resin compositions having excellent heat resistance and capable of retaining adhesiveness and transparency even after high-temperature storage were obtained.

In contrast, the pressure-sensitive adhesive resin compositions of Comparative Examples 1 and 2 were ascertained to considerably decrease in adhesiveness and transparency through high-temperature storage.

Thus, the Comparative Examples failed to give a pressure-sensitive adhesive resin composition having excellent heat resistance.

While the invention has been described in detail with reference to specific embodiments thereof, it will be apparent to one skilled in the art that various changes and modifications can be made therein without departing from the spirit and scope thereof.

Incidentally, the present application is based on Japanese Patent Application No. 2010-020612 filed on Feb. 1, 2010, and the contents are incorporated herein by reference.

All references cited herein are incorporated by reference herein in their entirety.

Also, all the references cited herein are incorporated as a whole.

The pressure-sensitive adhesive resin composition of the invention and the pressure-sensitive adhesive sheet and pressure-sensitive adhesive tape each using the composition can retain adhesiveness and transparency even after having been stored under high-temperature conditions, and have excellent heat resistance.

What is claimed is:

1. An acrylic pressure-sensitive adhesive resin composition comprising an organic-inorganic hybrid polymer synthesized from the following (a) to (d):
   (a) fine silica particles having silanol groups on a surface thereof;
   (b) a siloxane having at least one selected from a group consisting of an alkoxysilyl group and a silanol group at a molecular end thereof;
   (c) a trialkoxysilane represented by the following general formula (I); and
   (d) a (meth)acrylic monomer,

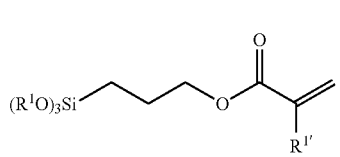

(I)

wherein $R^1$ represents a $C_{1-6}$ alkyl group, and $R^{1'}$ represents a hydrogen atom or a methyl group, wherein the organic-inorganic hybrid polymer is a copolymer constituted of a polysiloxane formed from 5 to 40% by weight (a) fine silica particles and 40 to 95% by weight (b) siloxane and an acrylic copolymer formed from at least 0.001 to 0.1% by weight (c) trialkoxysilane and 60 to 99.95% by weight (d) (meth)acrylic monomer, the polysiloxane and the acrylic copolymer being bonded with each other through siloxane bonds.

2. The acrylic pressure-sensitive adhesive resin composition according to claim 1, wherein the (a) fine silica particles are colloidal silica which has an average primary-particle diameter of 1 to 100 nm and a pH of 2 to 4 or of 8 to 10.

3. The acrylic pressure-sensitive adhesive resin composition according to claim 1, wherein the (b) siloxane comprises at least one selected from the group consisting of a siloxane having, at a molecular end thereof, an alkoxysilyl group in an amount of 10% by weight or more based on the whole molecule and a siloxane having, at a molecular end thereof, a silanol group in an amount of 10% by weight or less based on the whole molecule.

4. The acrylic pressure-sensitive adhesive resin composition according to claim 1, wherein the siloxane having an alkoxysilyl group at a molecular end thereof has a weight-average molecular weight of 100 to 6,000.

5. The acrylic pressure-sensitive adhesive resin composition according to claim 1, wherein the siloxane having a silanol group at a molecular end thereof has a weight-average molecular weight of 300 to 3,000.

6. The acrylic pressure-sensitive adhesive resin composition according to claim 1, wherein the (d) (meth)acrylic monomer is represented by the following general formula (II):

$$CH_2=C(R^2)COOR^3 \qquad (II)$$

wherein $R^2$ represents a hydrogen atom or a methyl group, and $R^3$ represents a hydrocarbon group having 2 to 14 carbon atoms.

7. The acrylic pressure-sensitive adhesive resin composition according to claim 1, wherein (e) a carboxyl-containing monomer is further included as a comonomer ingredient of an acrylic copolymer, and the (e) carboxyl-containing monomer, the (c) trialkoxysilane, and the (d) (meth)acrylic monomer form an acrylic copolymer.

8. A pressure-sensitive adhesive sheet or pressure-sensitive adhesive tape which comprises a substrate or a separator and, formed thereon, a layer comprising the acrylic pressure-sensitive adhesive resin composition according to claim 1.

* * * * *